(12) United States Patent
Platts

(10) Patent No.: US 10,579,315 B2
(45) Date of Patent: Mar. 3, 2020

(54) MULTI-LEVEL SYSTEM FOR LABEL CREATION AND PRINTING

(71) Applicant: Ecolab USA Inc., St. Paul, MN (US)

(72) Inventor: Matthew Bruce Platts, Crowley, TX (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/149,945

(22) Filed: May 9, 2016

(65) Prior Publication Data
US 2016/0328190 A1    Nov. 10, 2016

Related U.S. Application Data

(60) Provisional application No. 62/159,045, filed on May 8, 2015.

(51) Int. Cl.
*G06F 3/12* (2006.01)
*G06K 15/02* (2006.01)
*G06Q 10/08* (2012.01)

(52) U.S. Cl.
CPC .......... *G06F 3/1243* (2013.01); *G06F 3/1204* (2013.01); *G06F 3/1288* (2013.01); *G06K 15/024* (2013.01); *G06K 15/1807* (2013.01); *G06Q 10/087* (2013.01)

(58) Field of Classification Search
None
See application file for complete search history.

(56) References Cited

U.S. PATENT DOCUMENTS

| | | | | |
|---|---|---|---|---|
| 4,423,486 A | * | 12/1983 | Berner | G01G 19/4144 177/25.13 |
| 6,550,259 B2 | * | 4/2003 | Cartwright | F25D 29/00 62/126 |
| 2003/0004750 A1 | * | 1/2003 | Teraoka | G06Q 10/02 705/400 |
| 2003/0150148 A1 | | 8/2003 | Spear et al. | |
| 2005/0236113 A1 | * | 10/2005 | Tani | G06Q 10/087 156/558 |
| 2005/0261991 A1 | * | 11/2005 | Kennamer | G06Q 10/087 705/28 |
| 2006/0207144 A1 | | 9/2006 | Milliorn | |
| 2007/0061225 A1 | | 3/2007 | Havas | |
| 2007/0102512 A1 | * | 5/2007 | Doerwald | G06Q 10/087 235/383 |
| 2008/0015951 A1 | * | 1/2008 | Kerker | G06Q 10/0875 705/7.29 |
| 2008/0079978 A1 | * | 4/2008 | Horiuchi | H04N 1/387 358/1.13 |

(Continued)

FOREIGN PATENT DOCUMENTS

KR    1020140126888 A    11/2014
WO    03034329 A1    4/2003

(Continued)

*Primary Examiner* — Miya J Williams
(74) *Attorney, Agent, or Firm* — Fredrikson & Byron, P.A.

(57) ABSTRACT

A method for printing certain information on labels using a smart device. Product-related information, expiration information, and batch information is stored on a server and provided to a smart device. One of the products or batches is selected using the smart device. Labels incorporating certain product-related information are generated and sent to a printer.

21 Claims, 23 Drawing Sheets

(56) References Cited

U.S. PATENT DOCUMENTS

| | | | |
|---|---|---|---|
| 2008/0191012 A1* | 8/2008 | Monnier | G01G 19/4144 |
| | | | 235/385 |
| 2010/0280895 A1 | 11/2010 | Mottola | |
| 2011/0307316 A1* | 12/2011 | Peters | G06Q 30/0223 |
| | | | 705/14.24 |
| 2013/0018761 A1 | 1/2013 | Kwak | |
| 2014/0204401 A1* | 7/2014 | Salerno | B41J 3/4075 |
| | | | 358/1.6 |

FOREIGN PATENT DOCUMENTS

| | | | |
|---|---|---|---|
| WO | WO-03034329 A1 * | 4/2003 | |
| WO | 2015015006 A2 | 2/2015 | |
| WO | 2015144242 A1 | 10/2015 | |
| WO | 2016060638 A1 | 4/2016 | |

* cited by examiner

FIG. 3

| Ingredients | January | February | March | April | May | June | Monthly Average | 2014 Average | Variance |
|---|---|---|---|---|---|---|---|---|---|
| Coconut Cream Pie Crust | 24 | 29 | 34 | 44 | 54 | 49 | 41 | 36 | 5 |
| Lobster Tails Cook & Chill | 56 | 71 | 66 | 76 | 86 | 81 | 73 | 71 | 2 |
| Citrus Segments & Juice | 123 | 138 | 133 | 143 | 153 | 148 | 140 | 148 | -8 |
| Halibut 9oz | 76 | 91 | 86 | 96 | 106 | 101 | 93 | 99 | -6 |
| Halibut 7oz | 94 | 109 | 104 | 114 | 124 | 119 | 111 | 89 | 22 |
| Crab Cocktail Portions (Colossal) | 18 | 33 | 28 | 38 | 48 | 43 | 35 | 32 | 3 |
| Crab Cocktail Portions (Dungeness) | 33 | 48 | 43 | 53 | 63 | 58 | 50 | 56 | -6 |

FIG. 23

MULTI-LEVEL SYSTEM FOR LABEL CREATION AND PRINTING

RELATED APPLICATIONS

This application claims the benefit of U.S. Provisional Application No. 62/159,045, filed May 8, 2015, the content of which is hereby incorporated by reference in its entirety.

BACKGROUND

Food labels are commonly used in the food service and other industries to improve food quality and food safety. Labels may be affixed to food containers and may indicate information such as storage requirements or discard time. Labels often need to be printed one at a time, for each food container, or at best in multiples where a location has several containers of the same food item. Labels tend to be standardized, so employees may need to add any additional needed information manually.

Further, current label practices do not take into account the need for managing food. The employees who print labels for food products are not the same employees that manage the overall food management and ordering for a location or corporation. Tracking what foods have been labeled can also be difficult, making inventorying necessary and time-consuming. A need exists to print a more convenient, safe, and accurate method for creating, managing, and printing labels.

SUMMARY

Embodiments described herein improve processes for label creation and printing. Some methods include storing product-related information, expiration information, and batch information on a central server. The batch information defines one or more batches, with each batch specifying certain products. Some methods include providing the product-related information and batch information to a smart device. Some methods include receiving a selection of one of the products or batches on the smart device from a user. In such methods, if the user selects one of the batches, the products specified in the batch are selected. Some methods include generating one or more labels for each selected product. Such labels incorporate certain product-related information associated with the selected product and additional data obtained by analysis of one or more of a date, location, user, and the expiration information. Some methods include sending the one or more labels to a printer.

BRIEF DESCRIPTION OF DRAWINGS

FIG. 3 depicts an exemplary landing screen for a system operator.

FIG. 23 is an exemplary report illustrating the number of uses of a variety of food items.

DETAILED DESCRIPTION

Embodiments of the invention include a food rotation label printing system lets you print food rotation labels, such as those available from Daydots®, quickly with a touch of a button on a smart device, such as a tablet, smartphone, or PC. Such functionality enables fast and accurate labeling with a variety of additional benefits.

Embodiments can include a system comprising a suite of products that allow corporations and locations under the corporation umbrella to manage customized food item lists and label designs online. Corporations and/or locations may use mobile applications to print those labels, for example, using supported Bluetooth enabled label printers. Such systems remove the need for expensive hardware (e.g., integrated processor/printers, etc.) or the need to track such hardware. Instead, such systems may utilize a one or more smart devices in communication with one or more printers, allowing for greater functionality and simultaneous processing when compared to a single integrated device. In some embodiments, this solution also tracks label printing and use by end users for reporting purposes.

In some examples, systems provide an a-la-carte approach to food rotation label printing by providing end-user software at no-charge. Moreover, systems may allow the customer to run that software on their own devices, or on devices provided along with the system. Customers will also be able to select from a plurality of printers that range from entry-level low-cost options to printers that are enterpriseclass. Thus, the implementation cost of the system may be reduced, or allocated among system components (e.g., smart device, printer) at the user's discretion.

Figure 1:
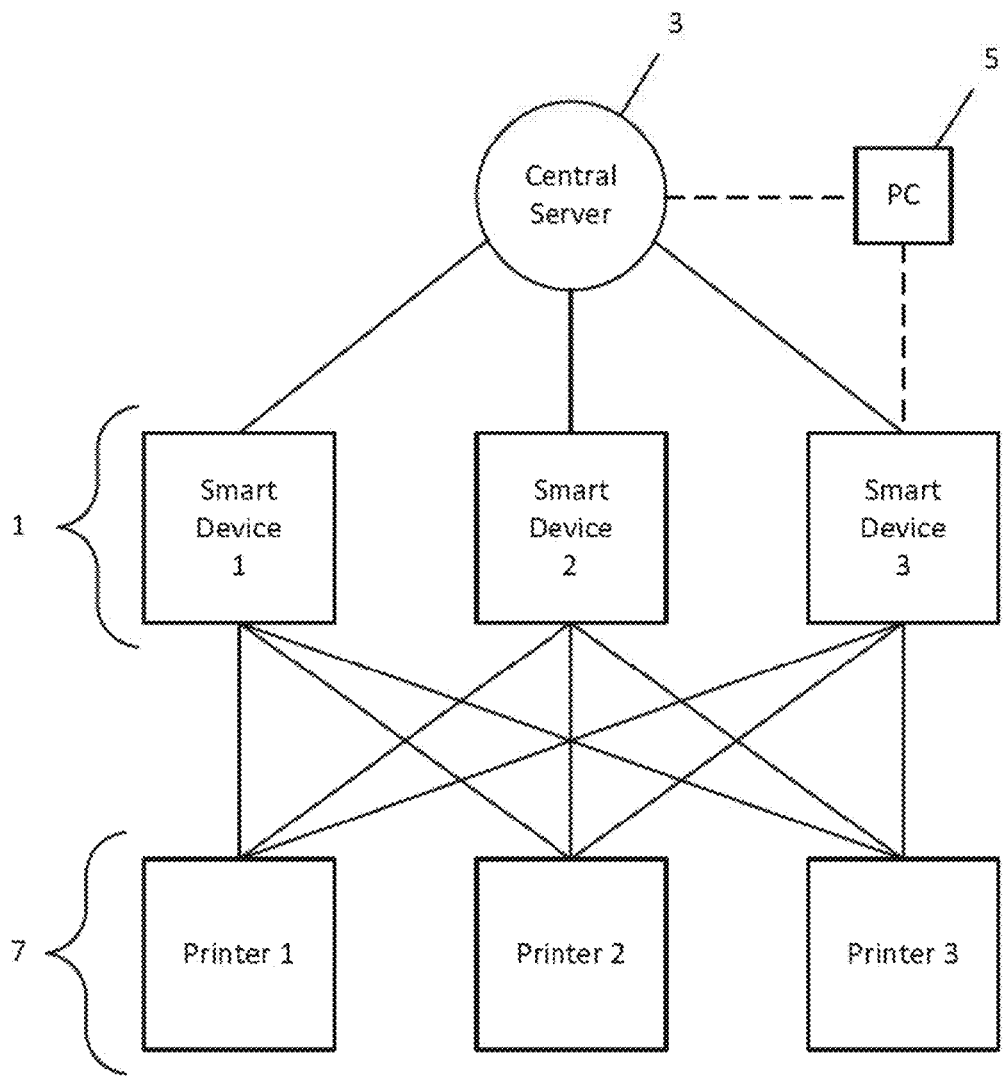
FIG. 1 is a system diagram illustrating an exemplary communication arrangement for generating and printing labels.

As described, in some embodiments, a system includes one or more smart devices 1 for generating labels and one or more printers 7 for printing labels. FIG. 1 is a system diagram illustrating an exemplary communication arrangement for generating and printing labels. As shown, smart devices 1 (shown as smart devices 1-3) are in communication with a central server 3. The central server 3 can be a cloud based or physical server, computer, or groups of servers or computers. The central server 3 may provide a user interface to enter a variety of product-related information and expiration information, for example, regarding food items (e.g., a Dashboard website). In some embodiments, only certain users may have access to the user interface of central server 3, called operators. Product-related information can include menu data, a thaw time, thaw instructions, cooking instructions, or other information associated with a food item. Expiration information can include shelf life, a shelf life after opening, a best-before-date, an expiration unit, a process for determining expiration data, or combinations thereof. Additionally or alternatively, central server 3 may receive statistics, aggregate, summarize, communicate, and analyze received data. In some embodiments, only operators may enter product-related information and expiration information. In some examples, central server 3 may generate alarms (e.g., identify anomalies at certain locations 106 relative to other locations 106 in corporate structure) or track usage applying different metrics as will be described below.

The central server 3 may provide details to the smart devices 1, including product-related information and expiration information regarding one or more food items. Product-related information can include menu data, a thaw time, thaw instructions, cooking instructions, or other information associated with a food item. Expiration information can include shelf life, a shelf life after opening, a best-before-date, an expiration unit, a process for determining expiration data, or combinations thereof. The central server 3 may additionally or alternative communicate lists or categories of food items to the smart devices 1, enabling faster browsing and selecting of food items when generating labels.

In some examples, smart devices 1 may be in direct communication with the central server 3, such as over a Wi-Fi or other wireless internet connection, for receiving information from the central server 3. The smart device 1 may receive data through an application ("app") installed on the smart device 1 or via a web page through an internet browser. In other examples, information may be downloaded to a local computer 5, from which it can be communicated to smart devices 1. The smart device 1 may access the information from memory through an app or the like.

The smart device 1 may utilize information to generate labels, e.g., for food items. Labels can be generated using information received from the central server 3 as well as additional data obtained by analysis. Additional data my be obtained by analysis of one or more of a date, location, user, and the expiration information. In some embodiments, the smart device 1 may utilize an internal clock and/or calendar to increase accuracy of label date and time information. For instance, the smart device 1 may utilize the date and time of label creation as well as information regarding a food item to generate additional data. Additional data may include use-by time and date for the food item. This use-by information may be added to the label.

In various examples, product-related information and/or expiration information used by the smart devices 1 may be updated. For example, the expiration time or other property of a food item for use with generating labels may change at some time. When information used by the smart device 1 to generate labels is to be updated, smart devices 1 in communication with the central server 3 may be updated automatically. In some examples, the central server 3 may push updates out to certain smart devices 1 in communication with the server. In other embodiments, smart devices 1 may periodically communicate with the server to check for available updates. In examples in which the smart devices 1 are not readily in communication with the central server 3, updates to the smart device 1 may be performed when connected via local computer 5.

Once a smart device 1 has generated a label, the device may send the label to a printer 7 for printing. Generally, printers 7 may be any printer appropriate for connecting to the smart device 1, for example, via a wired or wireless connection. Systems may utilize the processing power of the smart device 1 for generating labels, and therefore the associated printer 7 need not include complex computing capabilities. Similarly, in some examples, printers 7 may have a simple user interface without a need for touchscreen or many input buttons.

As shown in FIG. 1, systems may include one or more smart devices 1 and one or more printers 7 for generating and printing labels. In various embodiments, any of the smart devices 1 may be able to communicate with any of the printers 7, for example, via a Bluetooth connection. Bluetooth-enabled printing can take advantage of Bluetooth capabilities built-in to the smart device 1, and therefore requires little additional cost to enable efficient and wireless printing capabilities. Thus, a user generating labels on a smart device 1 may select the most convenient printer 7 or a printer 7 best suited to the specific label to be printed and easily direct a printing task to that printer 7. In addition, multiple devices may be used to simultaneously to generate labels, increasing efficiency in label generation, even if only a single printer 7 is to be used.

Figure 2:
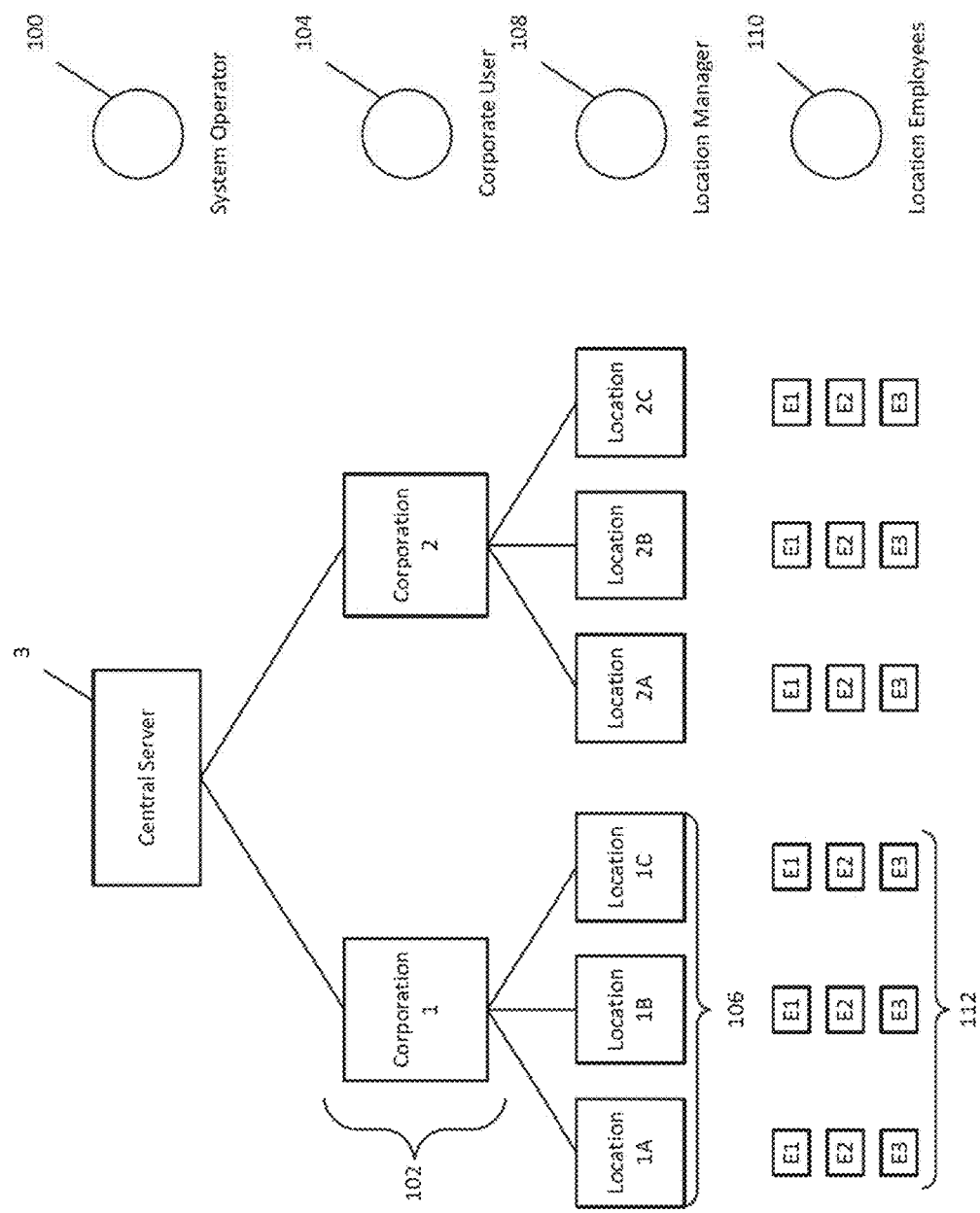
FIG. 2 is a system block diagram illustrating an exemplary hierarchy.

In some embodiments, a system can include a hierarchy of levels from which users at different levels may view or edit a variety of information within the system. FIG. 2 is a system block diagram illustrating an exemplary hierarchy. In the illustrated example, a system operator 100 may provide the structure for various corporations 102 (e.g., corporations 1 and 2) to build on for system implementation. For instance, a system operator 100 may provide support and feedback regarding operations of various corporations 102 involved in the system. Users at the system operator level may be able to log into the system via a PC to perform system operation duties.

Various users of the system may have access to and/or editing permissions for certain information within the system depending on the structure of the hierarchy. In some examples, a system operator 100 has access to information regarding several corporations 102. Corporate users 104 may access or edit information on the corporation level. Corporate level information may be disseminated to locations 106 of the corporation 102 (e.g., locations 1A-1C, 2A-2C) where location managers 108 may view or edit location-specific information. Some location-specific information may then be accessed locally by location employees 110 (e.g., E1-E3).

FIG. 3 is an exemplary landing screen for a system operator 100. As shown, the system operator 100 may be provided with access to a series of accounts on the system.

The system operator 100 may be able to organize accounts and store account information such as name and address on the account. The system operator 100 may be able to edit account details, and in some examples, may receive various data from each account. The system operator 102 may receive data regarding system use of a particular account to assist the account holder in managing system operations and/or data.

Figure 4:
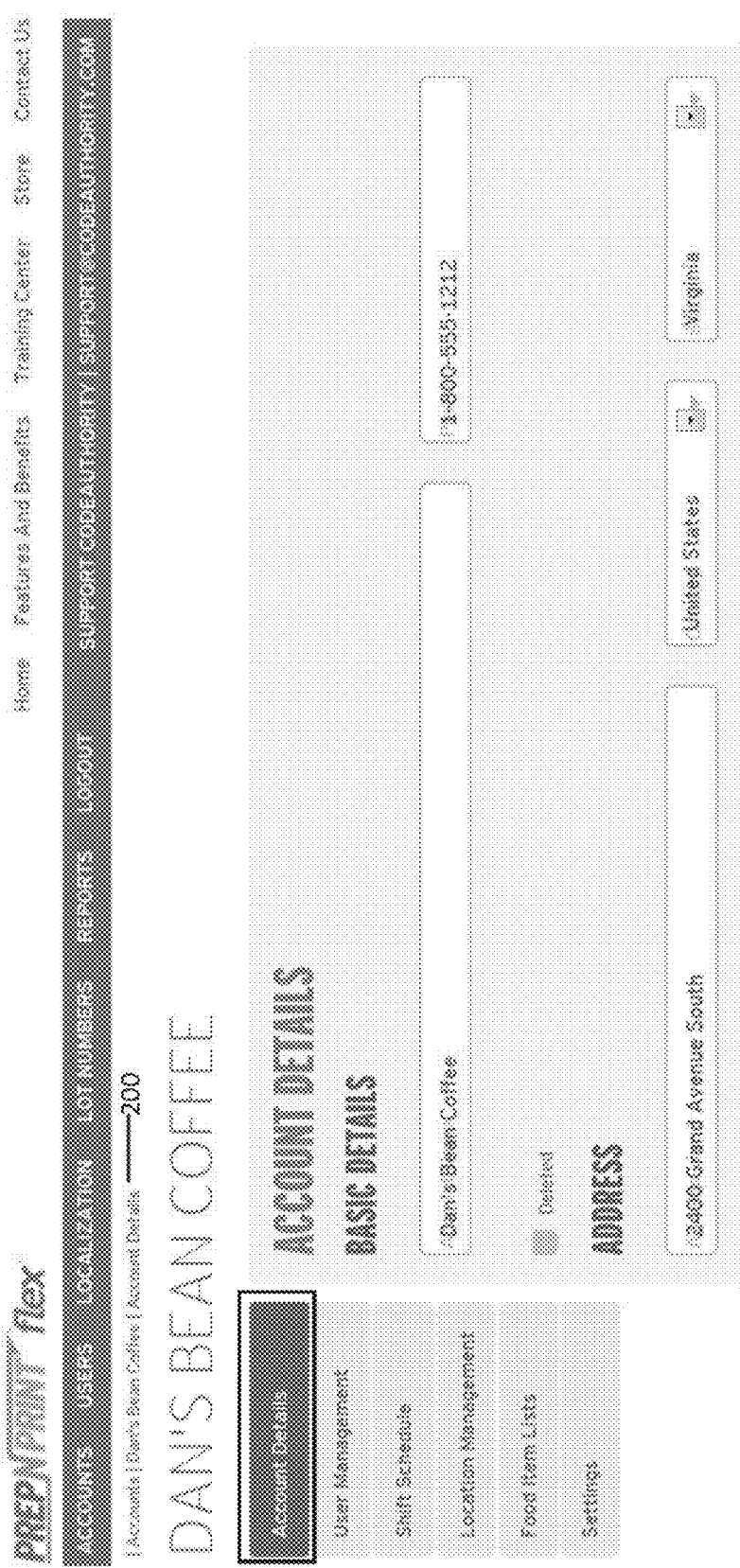
FIG. 4 depicts an exemplary account details landing page where a system operator may land after selecting an account to view or edit.

From the accounts list of FIG. 3, a system operator 102 may select an account to view or edit. FIG. 4 is an exemplary account details landing page where a system operator 102 may land after selecting an account to view or edit. The account details display may include basic information such as name, address, and telephone number for the corporation 102 associated with the account. From here, a system operator 102 may modify or view account details. In some embodiments, system operators 102 can only view and not edit certain details for the account.

In some embodiments, FIG. 4 may be similar to the main landing page for a corporation 102 accessing its account details from within the system, such as at the corporation level (e.g., corporations 1 and 2) of FIG. 2. For example, a user at the corporate level of a corporation 102 may log into a central server 3 storing account details and other information. As shown, the corporate user 104 may adjust account details within the system, or access and adjust additional information, such as user management information, shift schedules, location management, food item lists, and other settings.

Figure 5:
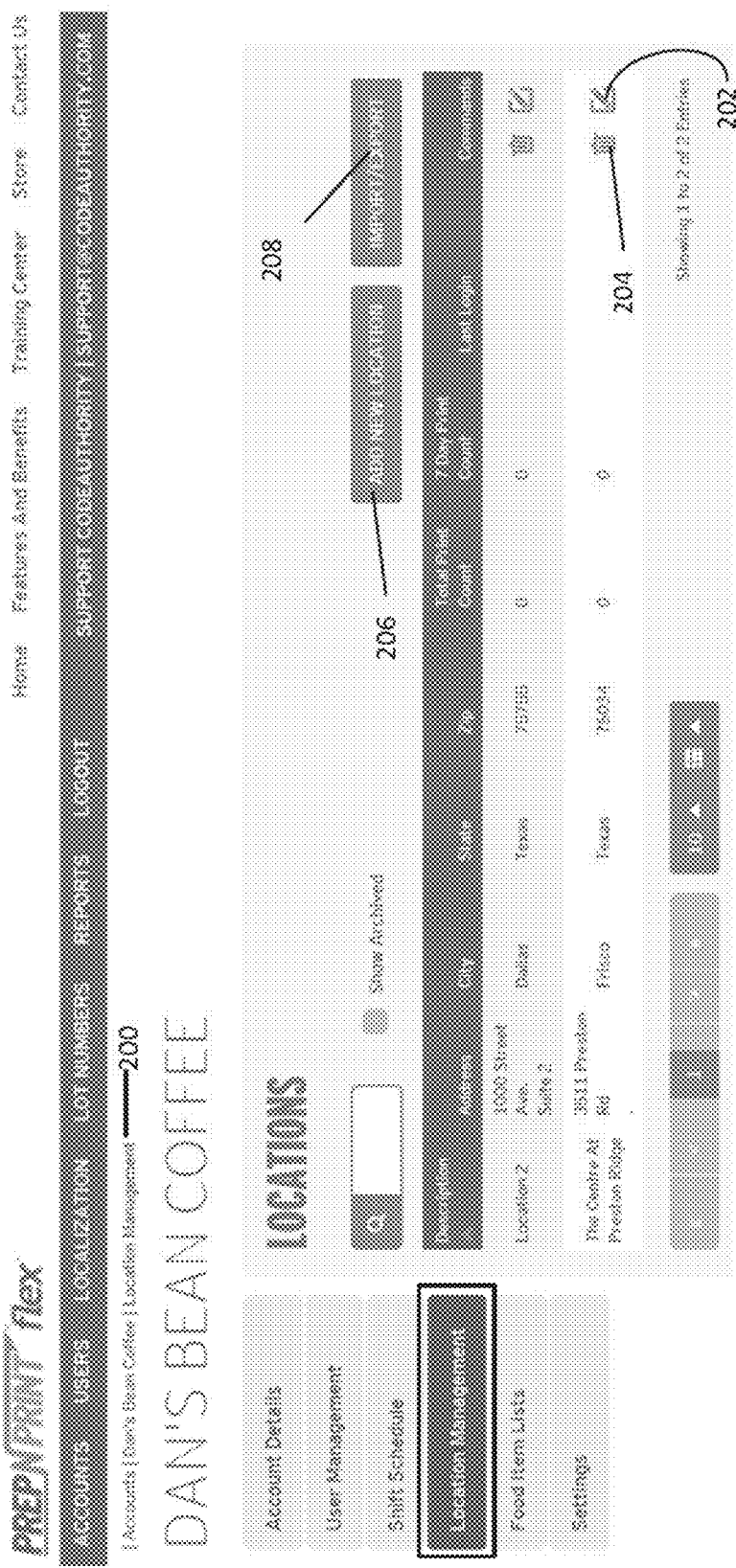
FIG. 5 depicts an exemplary location management interface for a corporate user to view or adjust details regarding one or more locations of the corporation.

FIG. 5 is an exemplary location management interface for a corporate user 104 to view or adjust details regarding one or more locations 106 of the corporation 102. With reference to the hierarchy of FIG. 2, a corporate user 104 for Corporation 1 may view a list of Locations 1A, 1B, and 1C associated with Corporation 1. From the locations screen, the corporate user 104 may edit details regarding each location 106 (202) or delete the location 106 from the list (204). The corporate user 104 may additionally add a new location 106 to the list (206) or choose to import or export location 106 details (208). The interface of FIG. 5 includes a breadcrumb trail 200 allowing quick navigation to various levels of the hierarchy.

Figure 6:
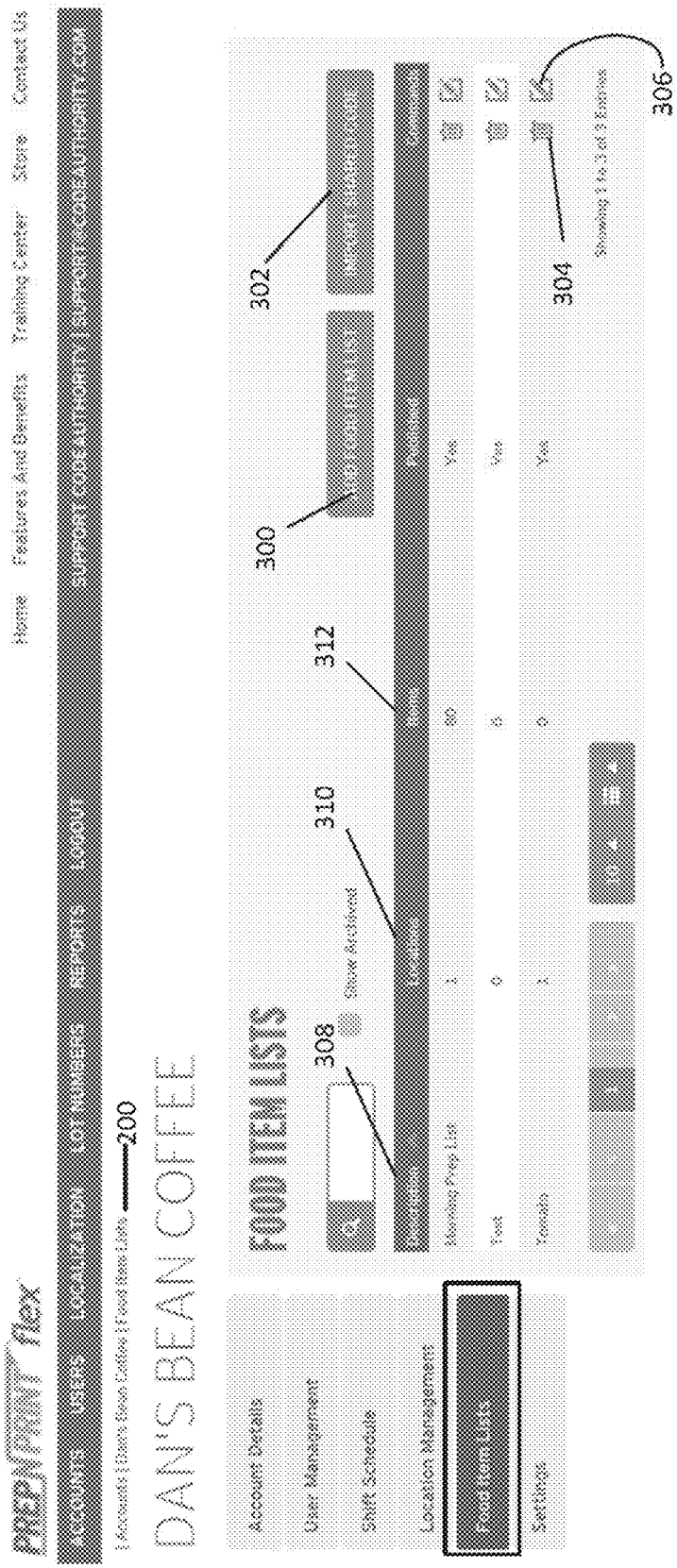
FIG. 6 is an exemplary view of a list of food items accessible by the corporate user.

FIG. 6 is an exemplary food item lists page accessible by the corporate user 104. Food item lists can be added (300), imported (302), deleted (304), or edited (306) on a corporate level by a corporate user 104. Food item lists may be created for a variety of different purposes. Lists can include for example, a general prep list, a breakfast list, and a dinner list. In general, a list can be created including any combination of items defined by the corporate user 104 that are grouped together for convenience (e.g., for use or preparation at similar times). The page of FIG. 6 includes a description of each list (308), the number of locations 106 each list is applied to (310), and the number of items in each list (312). In the illustrated example, the food item lists includes a prep list associated with one location 106 and including 80 items.

Figure 7:
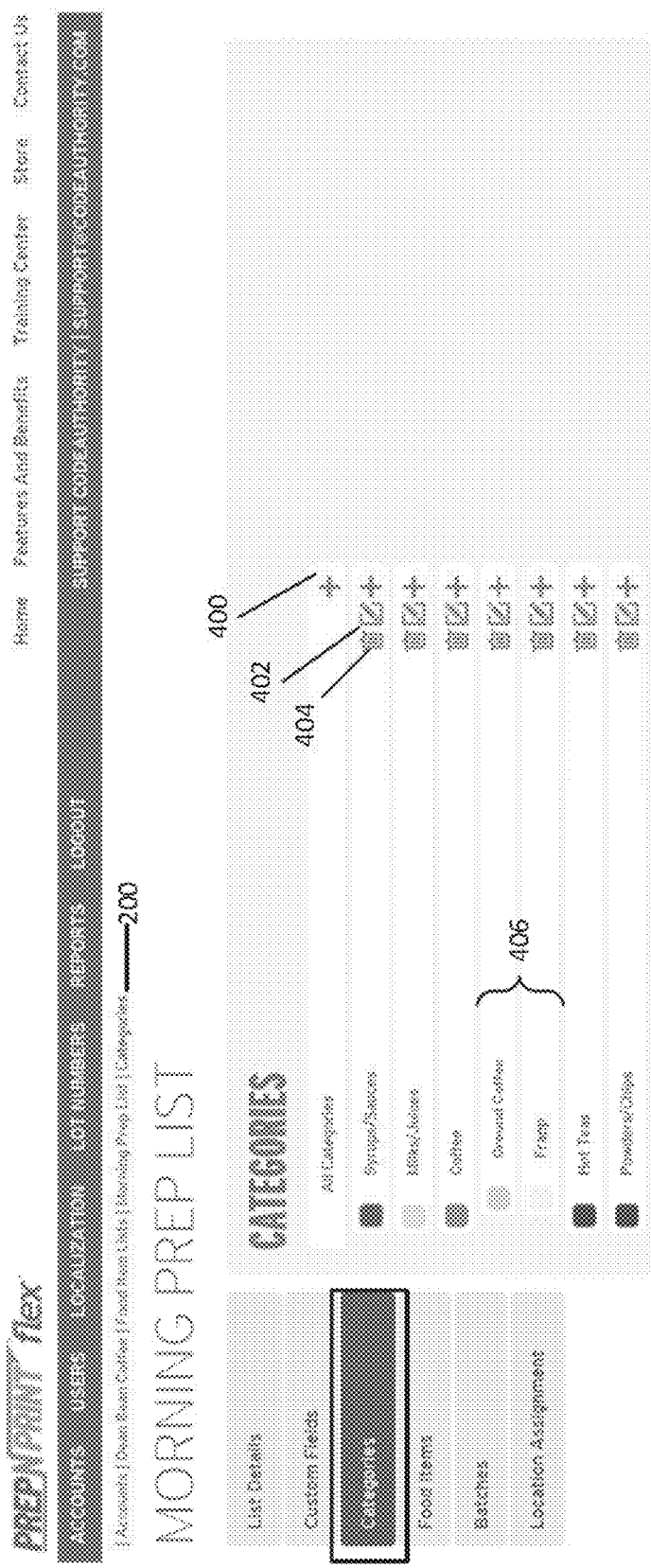
FIG. 7 depicts an exemplary view of a selected list broken down into categories.

Food lists can be generated from a database of food information. For example, creating or editing a food item list may provide the corporate user 104 access to the database of food information for selecting food items to include in a list. The database of food information can include categories of foods that may be selected. Similarly, items within a list may be organized by categories. FIG. 7 is an exemplary view of a selected list broken down into categories. As indicated, the interface of FIG. 7 provides a series of categories for food items within a prep list. Exemplary categories include syrups/sauces, milks/juices, and coffee. Corporate users 104 may define categories for easier organization of food items. Categories can be added (400), edited (402) or deleted (404) via the interface. In some embodiments, a corporate user 104 may generate subcategories of any category from the list. For instance, as shown, the coffee category includes subcategories of ground coffee and Frapp. (406) Categories can be color-coded for ease of category distinction.

The interface of FIG. 7 includes a navigation structure allowing the user to navigate between various aspects of a selected list, such as list details, categories, food items, batches, and location assignment. The interface includes breadcrumbs 200 to indicate the current location 106 of the user. For instance, in the example of FIG. 7, the breadcrumbs indicate which account the user analyzing (either the account associated with a corporate user 104 or which of several possible accounts accessible by a system operator 102). The breadcrumbs 200 further indicate that the current page is within the category of food item lists, which list is selected (the prep list) and which information regarding the list is being viewed (categories).

Figure 8:
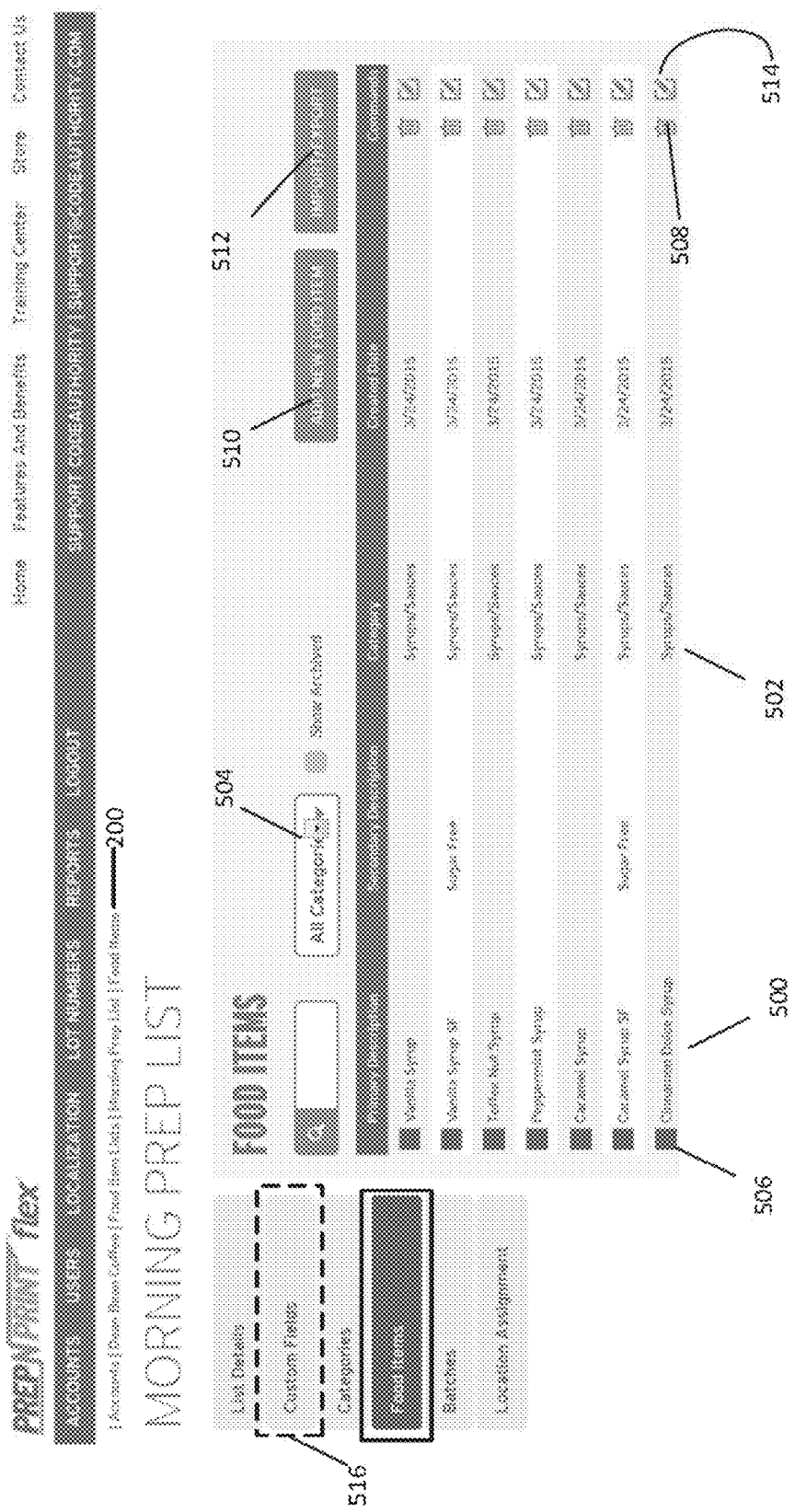
FIG. 8 depicts an exemplary interface showing a subset of food items associated with the selected food item list.

FIG. 8 is an exemplary interface showing a subset of food items associated with the selected food item list. As shown in the navigation structure and by the breadcrumbs, the interface of FIG. 8 represents food items within the food item list. The interface of FIG. 8 allows a user to view a description of each item (500) as well as the category to which each item is assigned (502). In some examples, a user may sort the list by any available identifier, such as by description, category, and the like. Similarly, a user may select a particular category of item in order to view items within the list belonging to a single category. (504) A user may also view the category color associated with the category of the item. (506) A corporate user 104 may delete an item from the list (508), add a new item to the list (510), import or export the list (512), or edit an item on the list (514).

Figure 9:
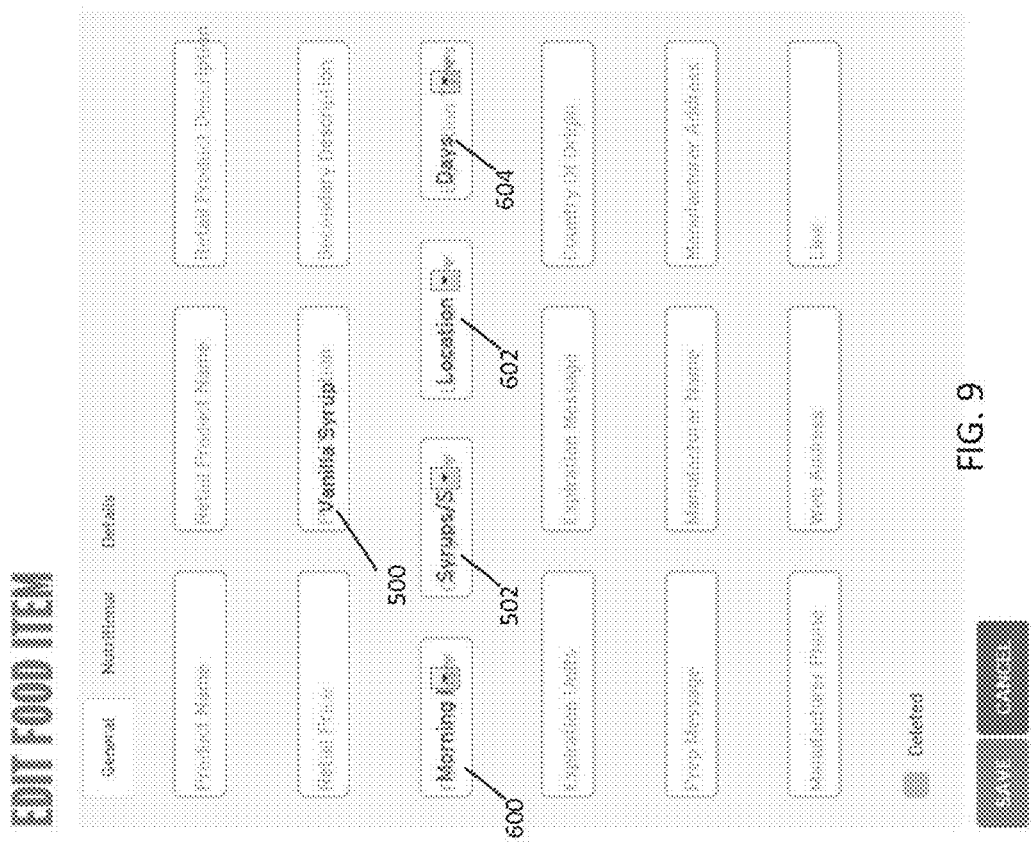
FIG. 9 depicts an exemplary edit/create food item window.

FIG. 9 is an exemplary edit/create food item window. In some examples, an interface such as shown in FIG. 9 will be presented to a user selecting to edit or add a food item. As shown in FIG. 9, various fields are provided into which a user (e.g., a corporate user 104) may enter information defining the food item. As shown, various categories of information may be entered/edited, including general information, nutritional information, and details. In general information, a user may input various product details, such as the product name, description (504), price, account associated with item (600), category of item (502) (e.g., from defined list of categories of FIG. 7), location of item (602), an expiration unit (e.g., days, specific time, specific shift, end-of-day after a number of days) for the item (604), and the like. Nutritional information can include any nutritional information to be included, for instance, on a label for an individually packaged item for sale.

Figure 10:
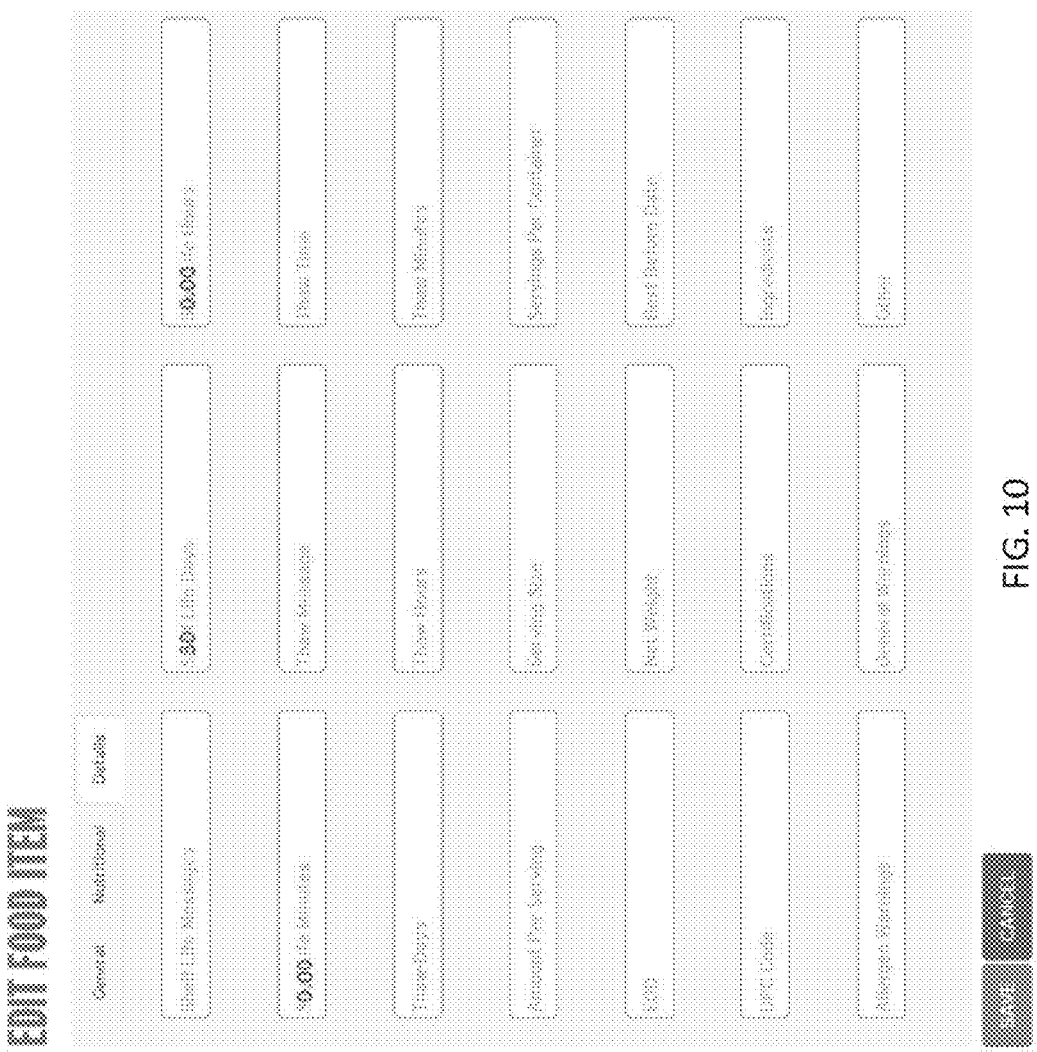
FIG. 10 depicts an exemplary interface for entering additional details for a food item.

FIG. 10 is an exemplary interface for entering additional details for a food item. As shown, additional details may include various item details, such as a shelf life, a thaw time, serving size, weight, best-before date, ingredients, various messages associated with the item, and the like.

In some examples, the edit food item interface may include an additional tab including any custom fields of information defined by the user. For example, with reference to FIG. 8, a user-selectable "custom fields" box is highlighted by a broken line. (516) A user may use this feature to generate any custom fields desired for inclusion on one or more labels. Once the user defines a custom field, information regarding the custom field may be entered in the "edit item" interface, for example, in a custom fields category.

This allows users (e.g., corporate users 104, location managers 108, etc.) to designate fields associated with practices specific to the corporation 102 or location 106 (e.g., internal reference numbers, event numbers, etc.).

In general, a user (e.g., a corporate user 104) may enter relevant details regarding an item into the system via the 'edit food item' interface. Each created/edited food item can be stored in lists like those listed in FIG. 6. Information associated with food items may be recalled during label generation for inclusion in a generated label. In some examples, a selectable subset of information may be included on a label depending on the intended destination and use of the food item.

Figure 11:
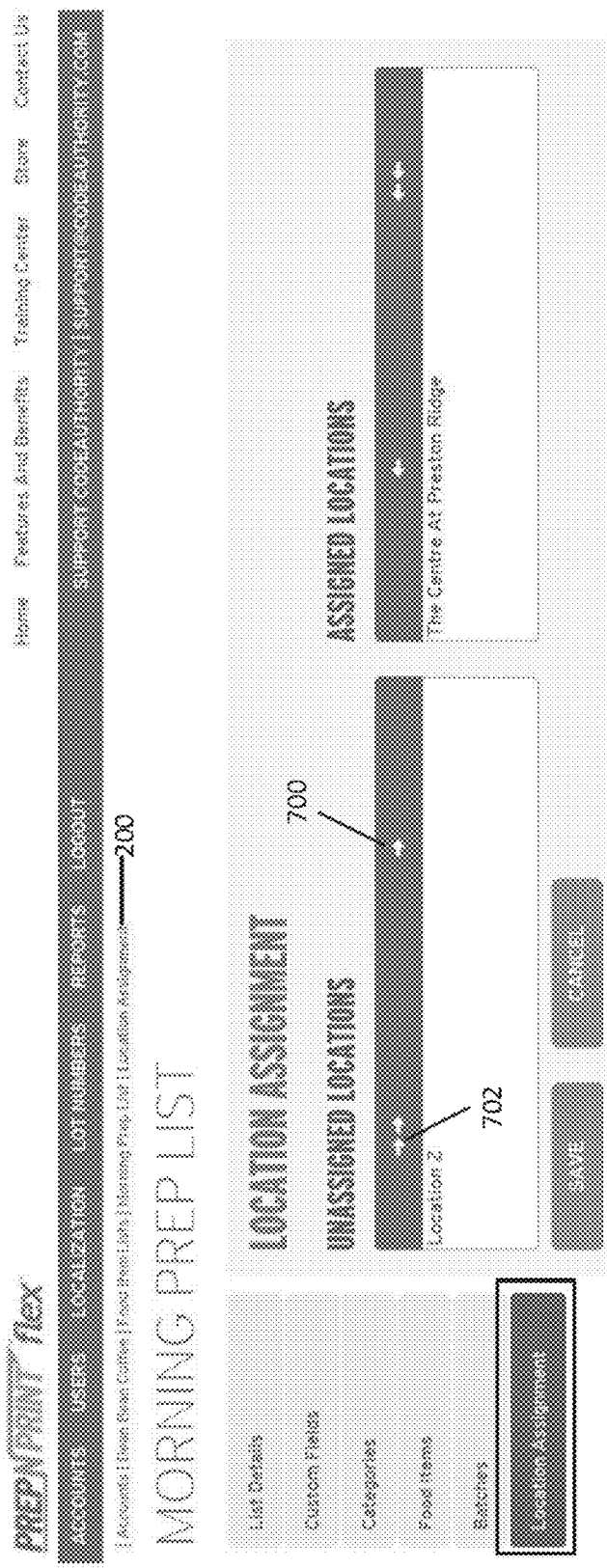
FIG. 11 depicts an exemplary interface for location assignment.

Once lists have been created, a corporate user 104 may determine which locations 106 receive which lists. For instance, a corporate user 104 may create a general list to be used across all locations 106, and may assign the list to all locations 106 accordingly. In other examples, a corporate user 104 may differentiate between locations 106 requiring different lists, and assign lists accordingly. As shown in FIG. 11, a 'location assignment' associated with a particular list (e.g., the prep list) allows for the assignment of the list to various locations 106. Prior to assigning a list to any locations 106, a list may appear in the 'unassigned locations' category. From here, one or more locations 106 may be selected and added to the 'assigned locations' category. Once a location 106 is moved to the 'assigned locations' category, the list will be communicated to that location 106. The interface of FIG. 11 provides the option to move only selected locations 106 from 'unassigned locations' to 'assigned locations' (700), as well as a 'move all' option (702), by which every available location is added to the 'assigned locations.'

Figure 12:
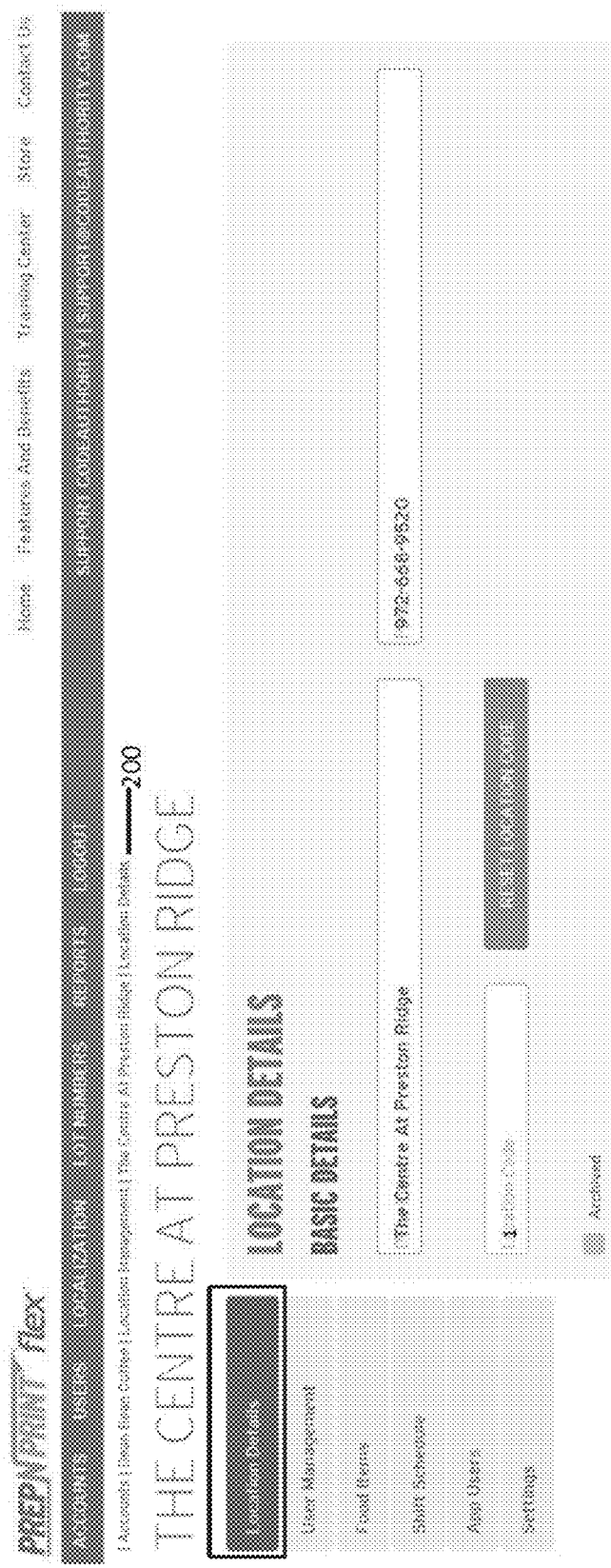
FIG. 12 depicts an exemplary interface for editing location details such as a description, phone number, and location code for use within the corporate structure.

Referring back to FIG. 5, a corporate user 104 may edit details of locations 106 such as those to which lists are assigned as discussed above. FIG. 12 is an exemplary interface for editing location details such as a description, phone number, and location code for use within the corporate structure. Breadcrumbs 200 in the interface of FIG. 12 identify a particular location 106 for editing or viewing information (e.g., accounts>corporation>location management>location). A variety of selectable menus for editing or viewing information associated with this location 106 are provided on the left, such as user management, food items, shift schedule, app users, and settings. In some examples, this interface level is available to personnel at a specific location 106, such as chefs, kitchen manager, general managers, chain managers, and the like. For instance, in some examples, the manager of a specific location 106 may have access to view and edit details regarding their particular location 106, but not details regarding other locations 106 under the same corporation 102. In some embodiments, system operators 100 and corporate users 104 may have the ability to view and edit such details among all locations 106.

Figure 13:
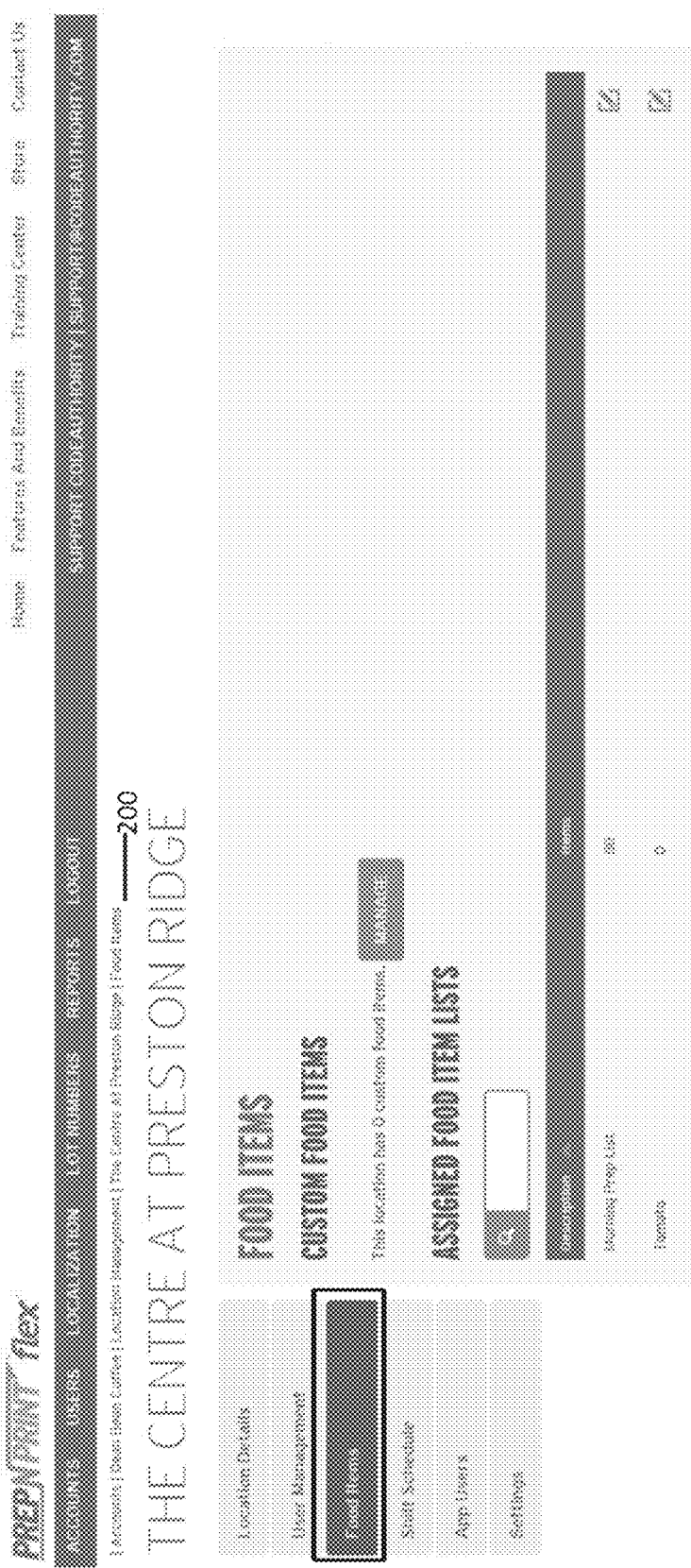
FIG. 13 depicts an exemplary interface showing food items associated with the location.

FIG. 13 depicts an exemplary interface showing food items associated with the location 106. Food items may include custom food items specific to the location 106, or may include assigned food item lists, such as those described above. From the interface, a user (e.g., a corporate user 104 or a location manager 108) may select to view a food item list associated with the location 106. Selecting to view a food item list may bring the user to a screen similar to that shown in FIGS. 7 and 8, in which food items and categories within the food list can be viewed.

However, unlike FIGS. 7 and 8, the breadcrumbs 200 associated with the food items and categories when accessed through the location 106 food lists (compared to the corporate food items of FIGS. 7 and 8) will lead back to the particular location 106. Accordingly, any adjustments made to food items or food lists by navigating to them from the 'location management' interface will result in adjustments only to the lists at that location 106. This way, individual locations 106 may adjust food items and lists based on local trends and market features without adjusting such parameters corporation-wide.

In some examples, a corporate user 104 may create a list of food items as described above and disseminate the list to one or more locations 106. The list can include a set of food items used among each of the locations 106. Each location 106 can receive the list from the corporate level and subsequently add to the list based on specific details regarding that location 106.

Once lists are defined at each location 106 (e.g., from the corporate level, the location level, or both), location employees 110 (e.g., E1, E2, E3 in FIG. 2) may access the lists, for example via a smart device 1, during the course of food processing. Location employees 110 can include restaurant staff including prep cooks, chefs, kitchen managers, and general managers, for example. Lists may remind a location employee 110 of the items to be processed during a certain shift or at certain times of day. The location employee 110 can use the lists to print labels for food items when necessary. That is, because details regarding the food item may be defined for the food item at the corporate level and disseminated to locations 106, location employees 110 may only need to select a food item to print a label associated therewith that includes necessary information.

Figures 14A, 14B:
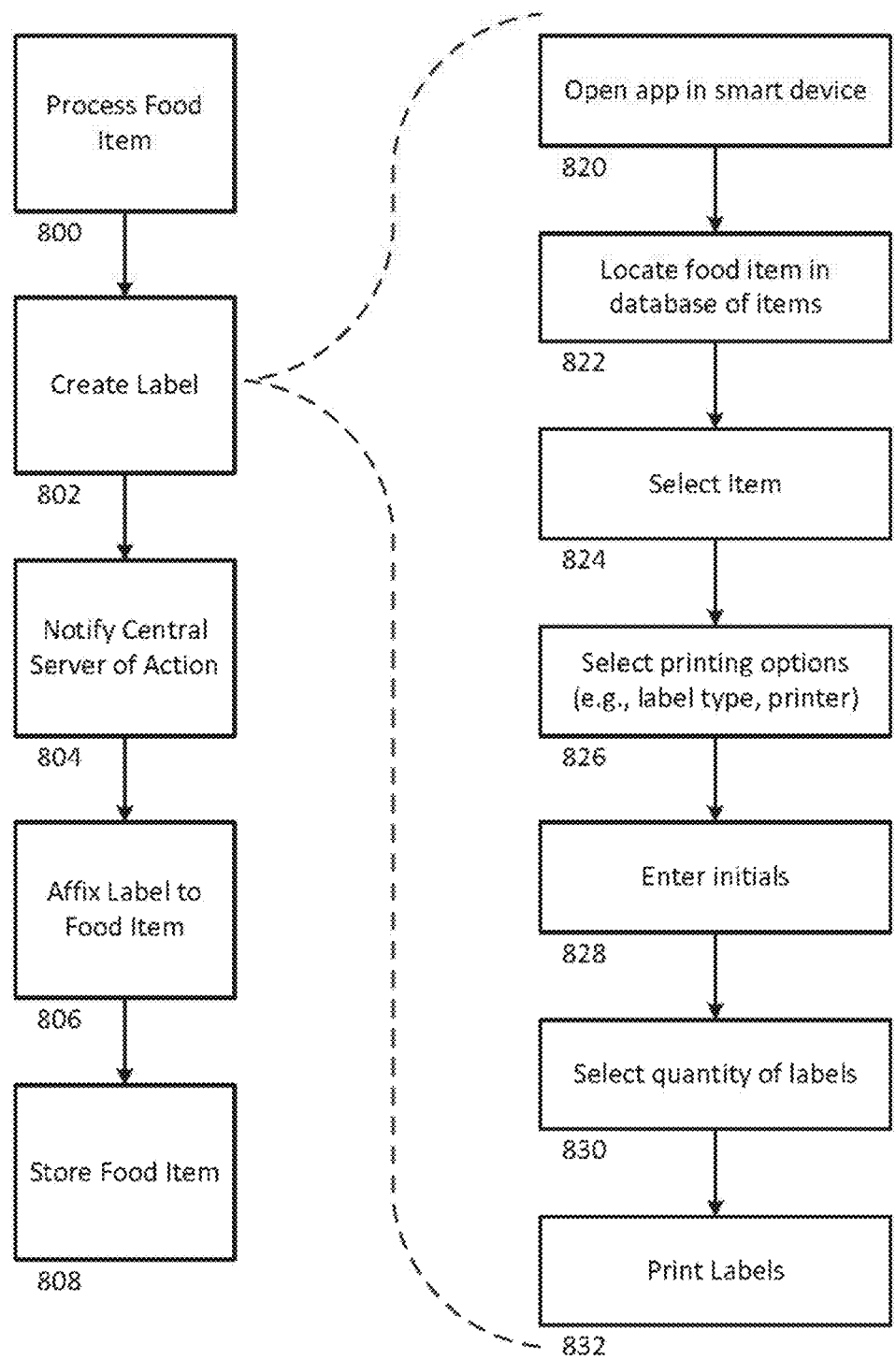
FIG. 14A is a process-flow diagram illustrating an exemplary process carried out by a location employee.
FIG. 14B is a process-flow diagram illustrating an exemplary label creation process.

FIG. 14A is a process-flow diagram illustrating an exemplary process carried out by a location employee 110. The location employee 110 can begin by processing a food item (800), such as opening an item, preparing an item, thawing an item, parceling an item, etc. The location employee 110 can create a label (802) for the processed food item, which will be described in more detail below. The location employee 110 may notify a central server 3 of an action taken (804), such as a label being created or the action performed while processing the food item. The location employee 110 can affix the label to the food item (806) and store the food item (808) appropriately. It will be appreciated that various steps may be permuted or omitted. For instance, it some embodiments, a user will not necessarily notify a central server 3 of an action taken (804). Additionally or alternatively, a user may create a label (802) prior to processing the food item (800). Many such permutations are possible.

Figure 15:
FIG. 15 depicts an exemplary interface for logging in on an exemplary tablet.

FIG. 14B is a process flow diagram illustrating an exemplary label creation process (802). In an exemplary method, a location employee 110 may open a label creating app in a smart device 1 (822). As shown in FIG. 15, the user may open the app on a smart device 1 and be prompted to log in to the app. Login information may dictate which permissions, food items, lists, etc. are available to the user. The user can use the app to locate a food item in a database of items (822). Such locating can include searching in a predefined list of food items, for example. In some examples, the database of available items is saved locally on the smart device 1 or is accessible from a server over an internet connection. In still further examples, the app is configured to locally store the database of items and to periodically update the database, such as through the internet or a computer connection. Once the item is located, the user can select the item (824) for which to print a label. As described previously, the item may include preloaded item information associated therewith, such as expiration data and the like.

Figure 16:
FIG. 16 depicts an exemplary interface by which a user may selected items from a list of items.

Items may be selected from a list of items, such as shown in FIG. 16. Items may be selectable from one or more defined categories of items as described above. The user may navigate through a hierarchy of food items including any number of categories and subcategories to locate a desired item. In some examples, item may be readily available from a list with which the location employee 110 is working. Additionally or alternatively, the app may include a search tool for searching for an item of interest. The search tool may search through all possible items, or may search within a particular selected category or list of food items. In the illustrated embodiment, the "Powders/Chips" category is selected, limiting the displayed results to food items belonging to that category. From within this category, the food item "Bar Mocha" is selected from a list of food items. In some embodiments, the app is defaulted to display and search from all items until another category is selected.

Figure 17:
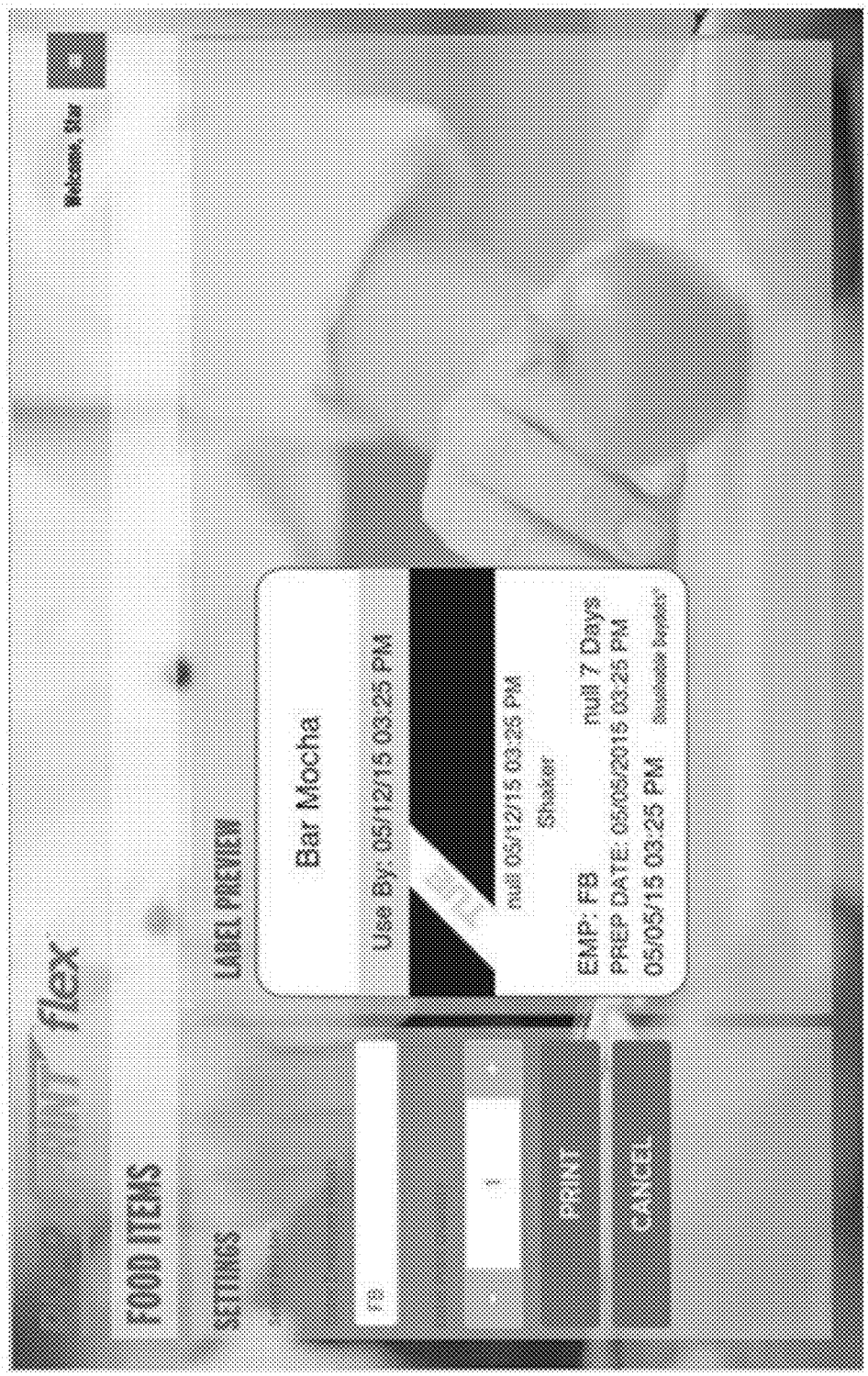
FIG. 17 depicts an exemplary interface by which a user may identify themselves and enter a quantity of labels to be printed.

Referring again to FIG. 14B, the user may select printing options for the label (826), such as a label type (e.g., size, shape, contents, etc.) and the preferred printer 7 for printing the label. In some embodiments, the available label types are dependent on a selected printer 7. In some embodiments, the available printers 7 for use are dependent on the label type. The user may enter initials into the app (828) as a way of signing off on the label and select the quantity of labels to be printed (830). FIG. 17 is an exemplary interface by which a user may identify themselves and enter a quantity of labels to be printed. The user may print the labels (832) by sending label information to the printer 7. Label information may be sent by wired or wireless communication between the smart device 1 and the printer 7.

As shown in FIG. 17, in some embodiments, the app interface may present a print preview to the user illustrating what the printed label will look like. In some examples, the app may generate the print preview directly from the printer language intended to be communicated to the printer 7. That is, the app may read the printer code and render an image on screen as would appear on a printed label. In some examples, the print preview is generated in substantially real time. For example, the print preview may update to reflect initials entered by the user.

Label information included on the label may include any of a variety of information associated with the selected item. Information included on the label may include product-related information, expiration information, and additional information. Additional information may be obtained by analysis of other information, including analysis of date, location, user, and the expiration information. Product-related information can include general food item information (e.g., FIG. 9), food item details (e.g., FIG. 10), or nutrition information.

The information included on a label may depend on the food item itself, or the manner in which it is to be used. For instance, a pre-packaged food item to be sold individually may be labeled with nutrition information, price information, product information, expiration information, and the like. By contrast, a food item that is opened in a restaurant kitchen setting may be labeled with a label that includes item identification information, date opened information, expiration information, and the like. Information may be additionally or alternatively included on the label in the form of a barcode, QR code, or other machine-readable format.

The app may utilize various features of the smart device 1 for generating label information. For instance, the app may receive a current date or time from the smart device 1 and, in conjunction with received food item details, calculate an expiration time or date of the food item for including on the label. In various embodiments, the contents of the label may be designated by a location employee 110, a location manager 108, or a corporate user 104.

Figure 18:
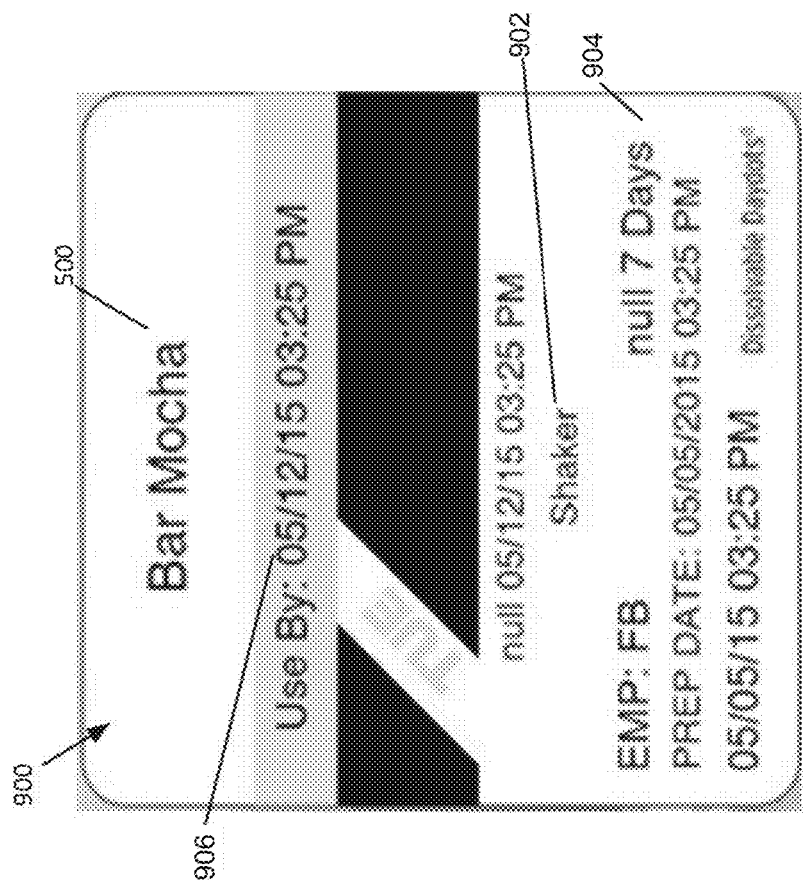
FIG. 18 is an exemplary label generated by a process such as those described above.

FIG. 18 is an exemplary label 900 generated by a process such as those described above. The exemplary label 900 includes product information, expiration information, and additional data. Product information on the exemplary label 900 includes a product description 500 ("Bar Mocha") as well as a second description 902 ("Shaker"). Expiration information on the exemplary label 900 includes use-by period 904 ("null 7 days") indicating that the food item is to be used within 7 days. As previously described, such expiration information may be associated with the item at, for example, the corporate level before being disseminated to locations 106. Additional data on the exemplary label includes a time and date stamp for label creation, as well as a section indicating the action taken at the time and date (e.g., "PREP DATE: May 5, 2015 3:25 PM"). Additional data on the exemplary label further includes a generated "Use By" date 906, which may be calculated using the time and date stamp in conjunction with the expiration information. The resulting illustrated label indicates that the Bar Mocha shaker, prepped on May 5, 2015 at 3:25 PM should be used within 7 days, by May 15, 2015 at 3:25 PM. This label may be printed by the location employee 110 and affixed to the food item prior to storage of the food item.

Figure 19:
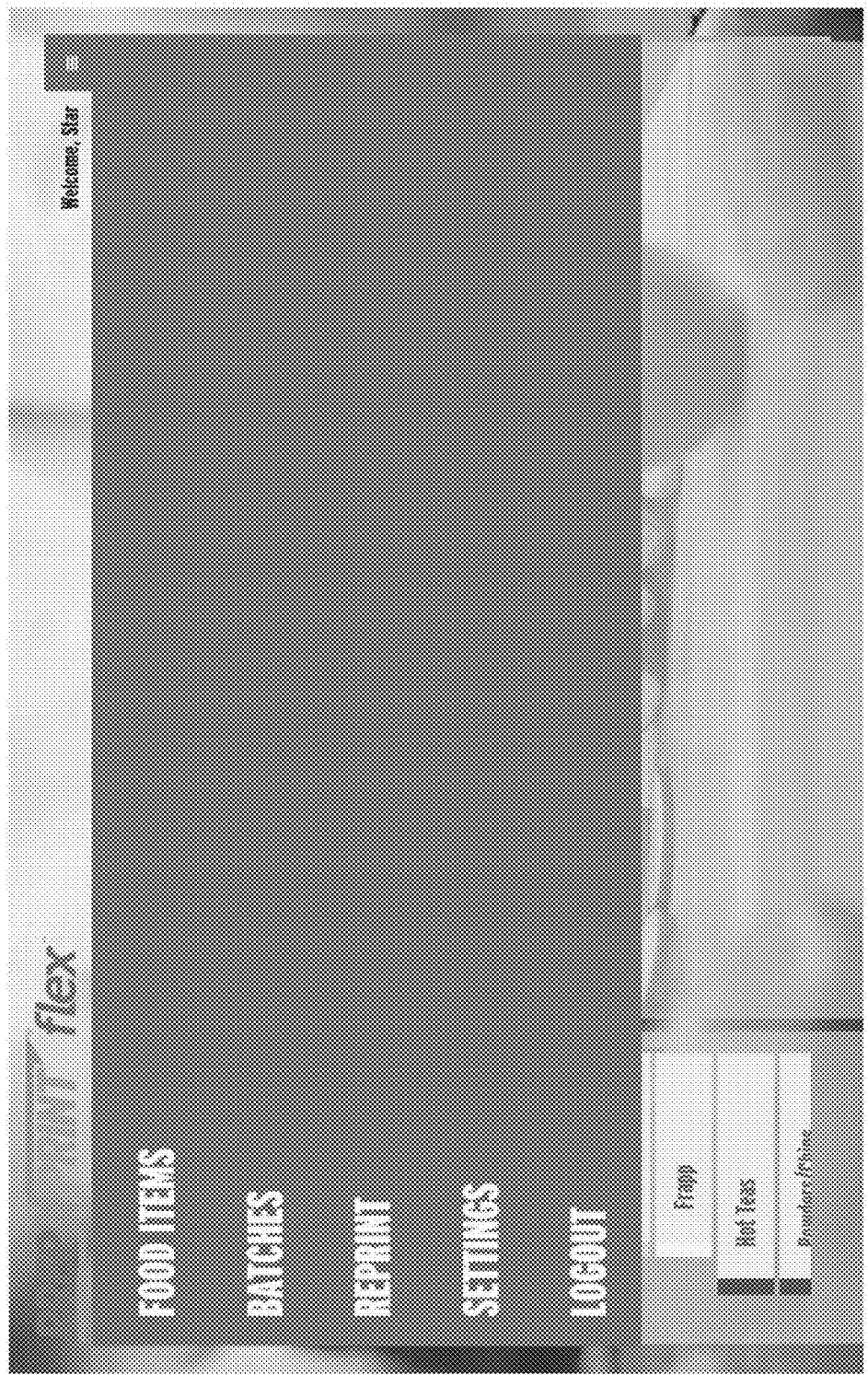
FIG. 19 is an exemplary view of a list of options for selecting by a user.
Figure 20:
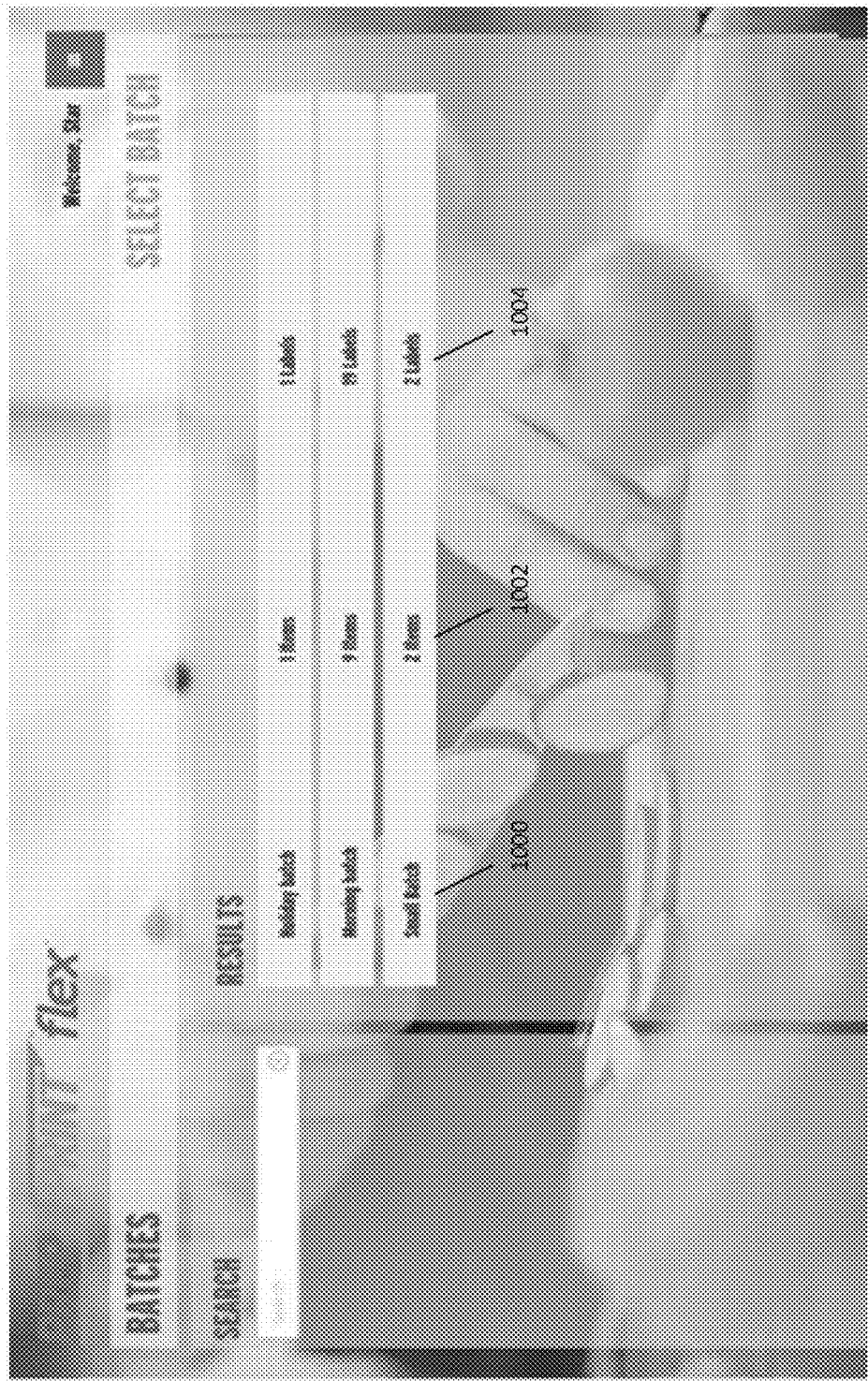
FIG. 20 is an exemplary interface showing a plurality of selectable batches.

In addition to browsing food items, a user of the app can select an options button to initiate a menu of selectable options. FIG. 19 is an exemplary view of a list of options for selecting by a user. From the list of options, a user may choose to view food items, view of adjust settings, or choose to logout. In some embodiments, a user may select a batch mode in which a plurality of labels may be generated at once. For example, a user (e.g., system operator 102, corporate user 104, location manager 108, location employee 110) may define a batch, in which a plurality of items in known quantities can be stored. In some examples, batches can be created from lists such as those described above. FIG. 20 is an exemplary interface showing a plurality of selectable batches. As shown, an interface includes a number of defined batches including a description (900), a number of items in each batch (902), and a number of total labels in each batch (904).

Figure 21:
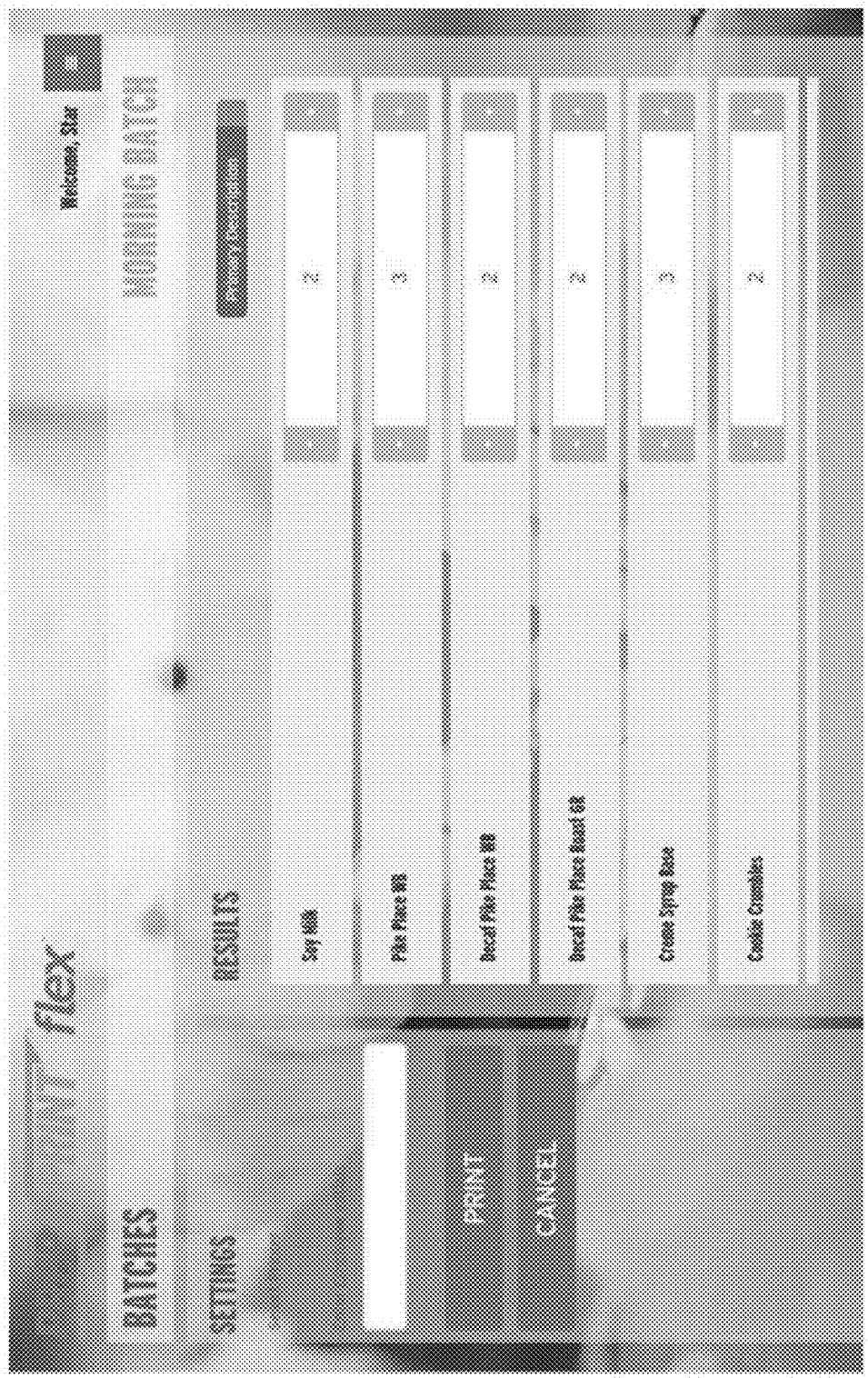
FIG. 21 is an exemplary interface showing details of a selected batch.

FIG. 21 is an exemplary interface showing details of a selected batch. In the illustrated exemplary interface, multiple food items are shown with a number of labels to be printed for each food item. In the selected batch interface, a user may enter initials for signing off on the printing of the entire batch of labels and choose to print the labels. By selecting to print the batch labels, the app may initiate the printing of the designated number of labels for each associated food item. Each label may include information associated with the food item as created, for instance, at the corporate level. Thus, an entire batch of labels such as that shown in FIG. 18 may be printed by simply selecting the batch and initiating a print operation.

As described above, in various embodiments, certain users may have permissions that others do not. For example, with reference to FIG. 2, in some embodiments, a corporate user 104 may create and edit food items, lists, batches, location information, and the like for each location 106 within the corporation 102. A location manager 108 may be able to create and edit such items on a location-wide scale, but not affect such information at other locations 106. In some examples, the location manager 108 may add to or adjust some or all information disseminated by the corporate level. In other examples, certain information sent from the corporate level may be locked for editing on a local level. Location employees 110 may be able to access food item information, lists, batches, and the like, such as via the app, and use the information to generate and print labels. However, in some examples, location employees 110 will not have permission to edit such information.

In various embodiments, system operators 102 may have varying degrees of access. In some examples, system operators 102 may have access similar to a corporate user 104 for each of a plurality of accounts. In other embodiments, the ability of the system operator 102 may be limited in some respects when compared to that of a corporate user 104. In general, in some examples, permissions granted to users at one level of the hierarchy (e.g., of FIG. 2) may include all of the permissions of users at lower levels of the hierarchy.

In some examples, actions taken at certain levels may be reported up to higher levels of the hierarchy. For instance, in some embodiments, a system can be configured so that whenever a location employee 110 generates and prints a label on a smart device 1, information regarding the label or an action associated with that label can be communicated to any combination of location managers 108, corporate users 104, or system operators 102. This allows for observation of actions taken at each location 106, which can be compared to actions taken at comparable locations 106. For example, with reference to the exemplary label in FIG. 18, a corporate user 104 may be able to observe how often a Bar Mocha Shaker label is generated and printed at a given location 106. This is indicative of the amount of Bar Mocha used at that location 106. This information can be analyzed or compared to other locations 106 to identify consumption amounts, patterns, or anomalies between locations 106 for various food items.

With reference to FIG. 19, in some embodiments, a user may select to reprint a label that had been previously printed. For instance, if a label is printed when a food item is opened, and the food item is to be transferred to a different container prior to an expiration event, the user may wish to print a label for the new container. However, the user may wish to keep the same 'opened date' or other such information from the previous label instead of generating new information. The reprint option will allow the user to reprint the same label, thereby maintaining the same expiration or other information from the original label.

Figure 22:
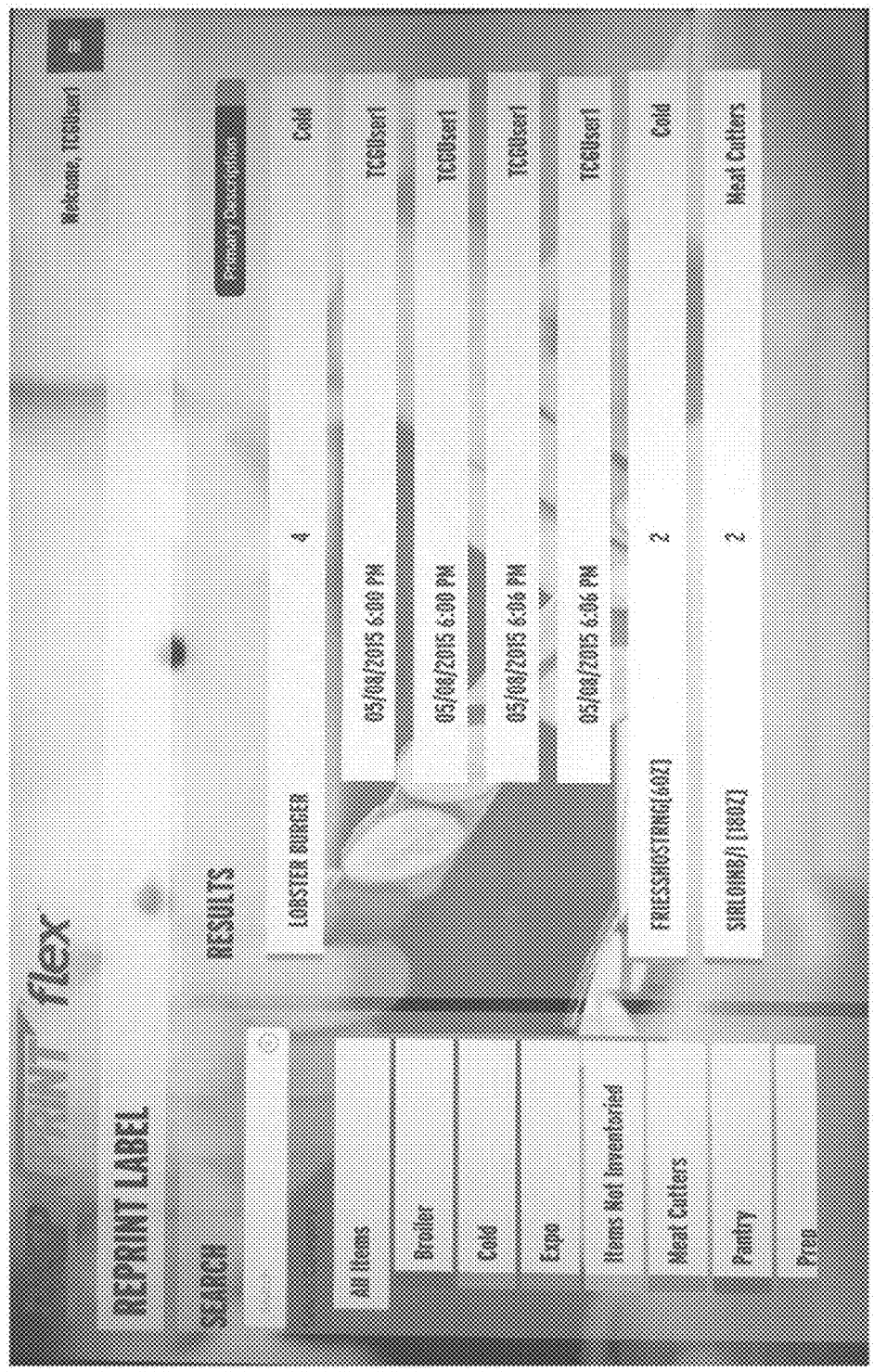
FIG. 22 is an exemplary reprint screen.

FIG. 22 is an exemplary reprint screen. As shown, a user may select a label to reprint based on a variety of information. In the illustrated example, reprint information includes food item, category, date and time of original print, the original print user, and the like. Labels may be available for reprinting for a predetermine period of time following a first printing. In various embodiments, this time can be defined by a user on a various levels, including a system operator 102, a corporate user 104, or a location manager 108.

FIG. 23 is an exemplary report illustrating the number of uses of a variety of food items. As shown, the collected data includes monthly usage statistics for each of the food items (e.g., the number of labels printed for each item), as well as a monthly average usage and a previous average. In addition, a variance from the previous average is determined. This allows a user (e.g., a corporate user 104) to quickly view information regarding the use rates of the food items and trends compared to previous usage. Similar reports may be created for a variety of locations 106 and compared to one another to highlight location-based trends or anomalies. Data such as shown in FIG. 23 may be automatically calculated and made available to users (e.g., corporate users 104) via a dashboard website or other interface.

In some examples, systems can operate in an online mode, in which smart devices 1 at the location employee 110 level are in communication with a central server 3 accessible by other users, such as location managers 108, corporate users 104, and system operators 102. In such embodiments, updates to food item details, lists, batches, and the like can be periodically updated on the employees' smart devices 1. In some embodiments, updates can be communicated to smart devices 1 in substantially real time. Similarly, in an online mode, notifications of actions taken by location employees 110 (e.g., generating and printing labels) can be communicated to the central server 3 periodically or in substantially real time. For example, data for populating the report of FIG. 23 may be communicated from smart devices 1 used to generate and print labels to the central server 3 periodically or in real time to update information used to generate the report.

Some systems work in an offline mode, in which smart devices 1 may not be in communication with a central server 3. In some such embodiments, an intermediate communication may occur between location smart devices 1 and a location PC. Information can be transferred via wired connection or removable memory (e.g., USB or SD card). In such embodiments, corporate-level defined food item information, lists, batches, and the like may be communicated to a local computer 5 at one or more locations 106. This information can be subsequently communicated to smart devices 1 from the local PC. Similarly, information regarding the timing of actions performed by location employee 110 (e.g., generating and printing labels) can be communicated from the employees' smart devices 1 to the local computer 5, and subsequently communicated to the central server 3 by the local computer 5.

The invention claimed is:
1. A method of label printing, the method comprising:
storing, on a central server, product information comprising:
product-related information and expiration information for each product of a plurality of products; and
pre-defined batch information pre-defining a batch specifying multiple products of the plurality of products, at least two products of the multiple products being of different product types;
transmitting, by the central server, the product information to a smart device, wherein a local database stored on the smart device is updated with the product information;
receiving, by the smart device, a selection of the batch, wherein selection of the batch results in selection of each product specified in the batch;
generating, by the smart device for each selected product, analytical data by analyzing at least one of date, location, user, and expiration information for the respective selected product;
generating, by the smart device for each selected product within the pre-defined batch, a respective dataset representative of a label including product-related information and the respective analytical data corresponding to the respective selected product; and
transmitting, by the smart device, the respective datasets to a printer,
whereby labels corresponding to the datasets are printed by the printer, the labels including at least some of the product information that updated the local database stored on the smart device.

2. The method of claim 1, wherein the product-related information, batch information, and expiration information are entered by an operator.

3. The method of claim 1, wherein the expiration information includes at least one of: a shelf life, a shelf life after opening, a best-before-date, an expiration unit, and a process for determining expiration data.

4. The method of claim 1, wherein the batch information for each batch includes a location assignment.

5. The method of claim 1, wherein the product-related information and analytical data to be included into the dataset are selected by the operator or by the user.

6. The method of claim 1, wherein the analytical data includes an expiration date and time.

7. The method of claim 6, wherein the expiration date and time are calculated by obtaining a date and time from an internal calendar of the smart device and combining the date and time with the expiration information.

8. A method of label printing, the method comprising:
storing, on a central server, product information comprising:
product-related information and expiration information for each product of a plurality of products; and
pre-defined batch information pre-defining a batch specifying multiple products of the plurality of products, at least two products of the multiple products being of different product types;
transmitting, by the central server, the product information to a smart device, wherein a local database stored on the smart device is updated with the product information;
receiving, by the smart device, a selection of the batch, wherein selection of the batch results in selection of each product specified in the batch;
generating, by the smart device for each selected product, analytical data by analyzing at least one of date, location, user, and the expiration information to produce an expiration date and time for the selected product, the expiration date and time for the selected product being calculated by obtaining a date and time from an internal calendar of the smart device and combining the date and time with the respective expiration information for the selected product;
generating, by the smart device for each selected product within the pre-defined batch, a respective dataset representative of a label for the selected product, the dataset including respective product-related information and the respective expiration date and time; and
transmitting, by the smart device, the generated datasets to a printer,
whereby labels corresponding to the datasets are printed by the printer, the labels including at least some of the product information that updated the local database stored on the smart device.

9. The method of claim 8, wherein the product information is entered by an operator.

10. The method of claim 8, wherein the expiration information includes at least one of: a shelf life, a shelf life after opening, a best-before-date, an expiration unit, and a process for determining expiration data.

11. The method of claim 8, wherein the product-related information and analytical data to be included into the dataset are selected by the operator or by the user.

12. The method of claim 8, wherein storing also includes storage of batch information defining one or more batches, each batch specifying multiple products of the plurality of products.

13. The method of claim 12, wherein the batch information for each batch includes a location assignment.

14. The method of claim 12, wherein the product information includes the batch information.

15. The method of claim 8, wherein receiving also includes receiving a selection of a batch, the products specified in the batch being selected via selection of the batch.

16. A method of label printing, the method comprising:
storing, on a central server, product information comprising:
product-related information and expiration information for each product of a plurality of products; and
pre-defined batch information pre-defining a batch specifying multiple products of the plurality of products, and specifying a location, at least two products of the multiple products being of different product types;
transmitting, by the central server, the product information to a smart device assigned to the location, wherein a local database stored on the smart device is updated with the product information;
receiving, by the smart device, a selection of the batch, the products specified in the batch being selected via selection of the batch;
generating, by the smart device for each selected product, analytical data by analyzing at least one of date, location, user, and expiration information for the respective selected product;
generating, by the smart device for each selected product within the pre-defined batch at the location, a respective dataset representative of a label including product-related information and the respective analytical data corresponding to the selected product; and
transmitting, by the smart device, the respective datasets to a printer, whereby labels corresponding to the datasets are printed by the printer, the labels including at least some of the product information that updated the local database stored on the smart device.

17. The method of claim 16, wherein the product-related information and batch information is entered by an operator.

18. The method of claim 16, wherein the expiration information includes at least one of: a shelf life, a shelf life after opening, a best-before-date, an expiration unit, and a process for determining expiration data.

19. The method of claim 16, wherein the respective product-related information and respective analytical data to be included into the respective dataset are selected by the operator or by the user.

20. The method of claim 16, wherein the respective analytical data includes an expiration date and time.

21. The method of claim 20, wherein the expiration date and time are calculated by obtaining a date and time from an internal calendar of the smart device and combining the date and time with the expiration information.

* * * * *